R. McDOWELL.
CHERRY SEEDING MACHINE.
APPLICATION FILED FEB. 7, 1911.
1,048,331.
Patented Dec. 24, 1912.
5 SHEETS—SHEET 3.
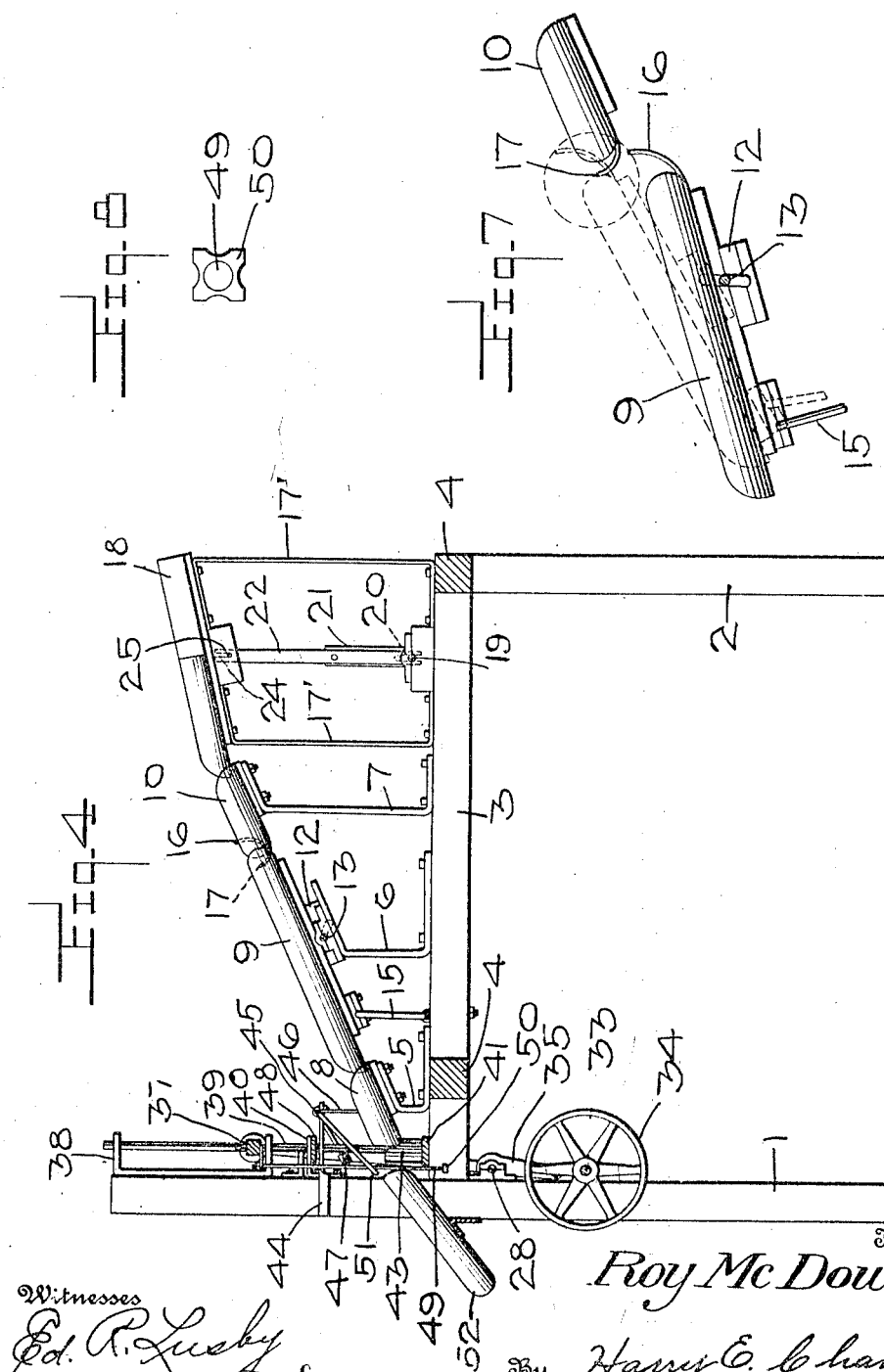
Witnesses
Ed. R. Lusby
Harry M. Test
Inventor
Roy McDowell
By Harry E. Chandlee
Attorney

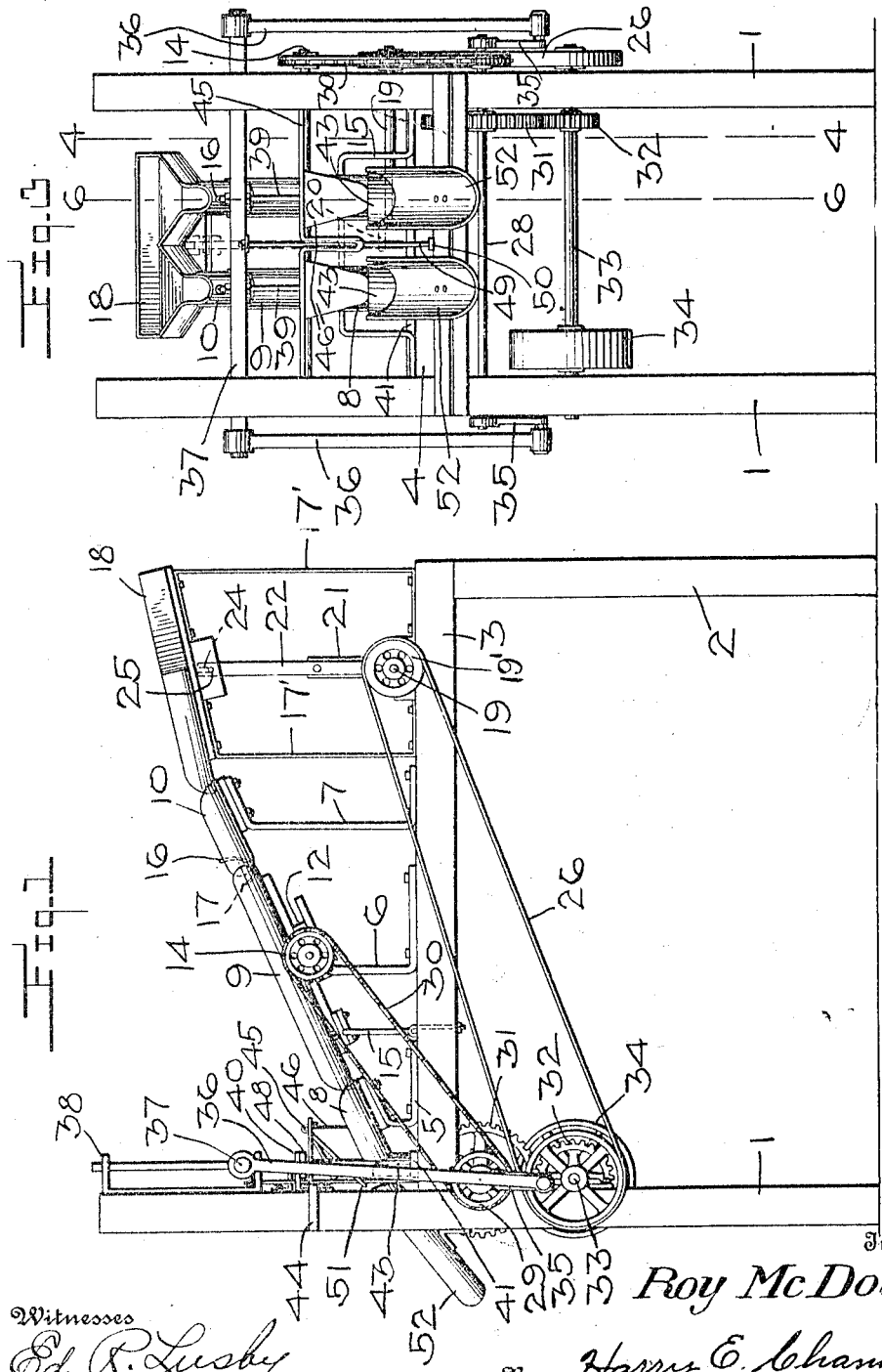

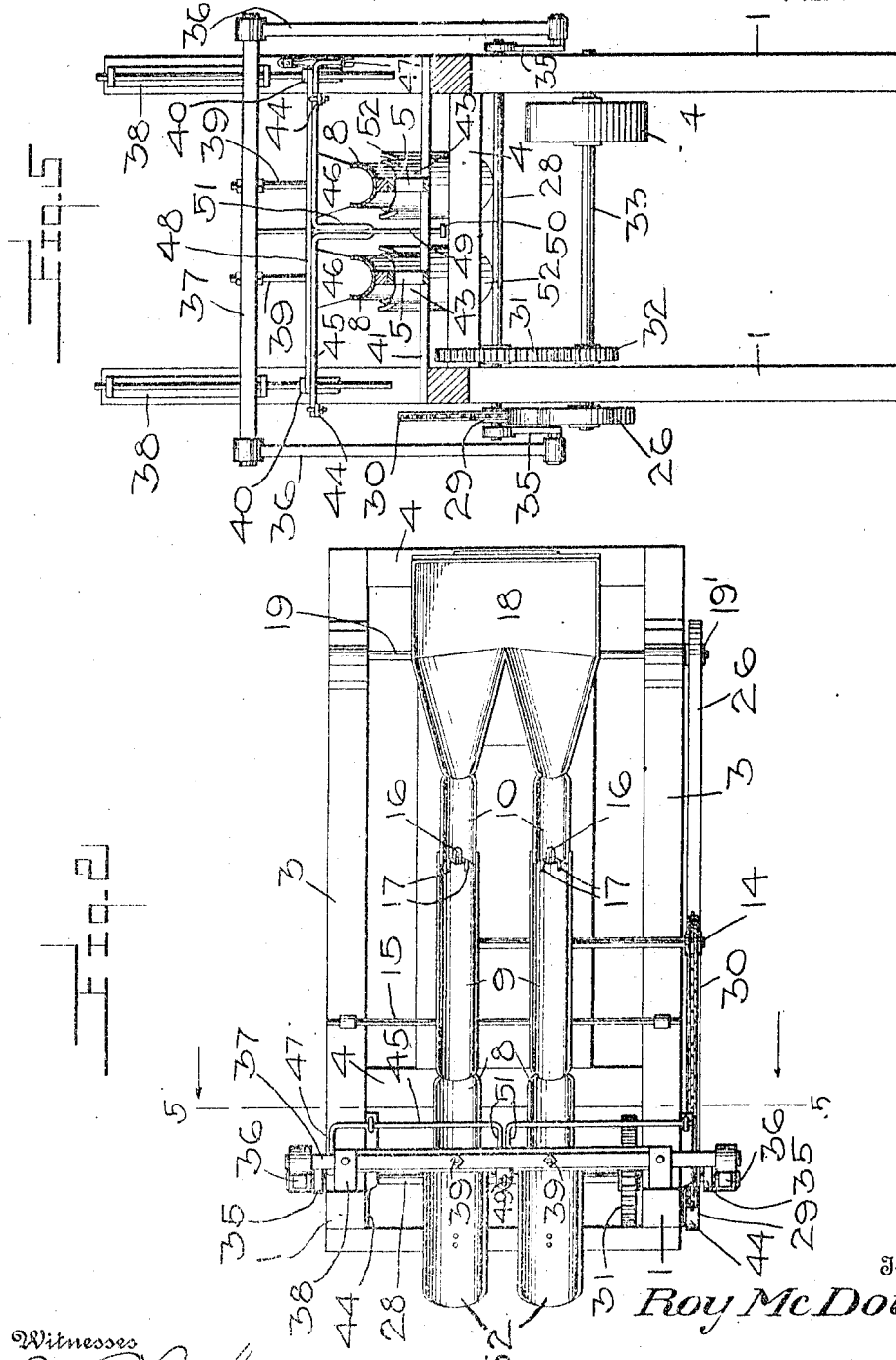

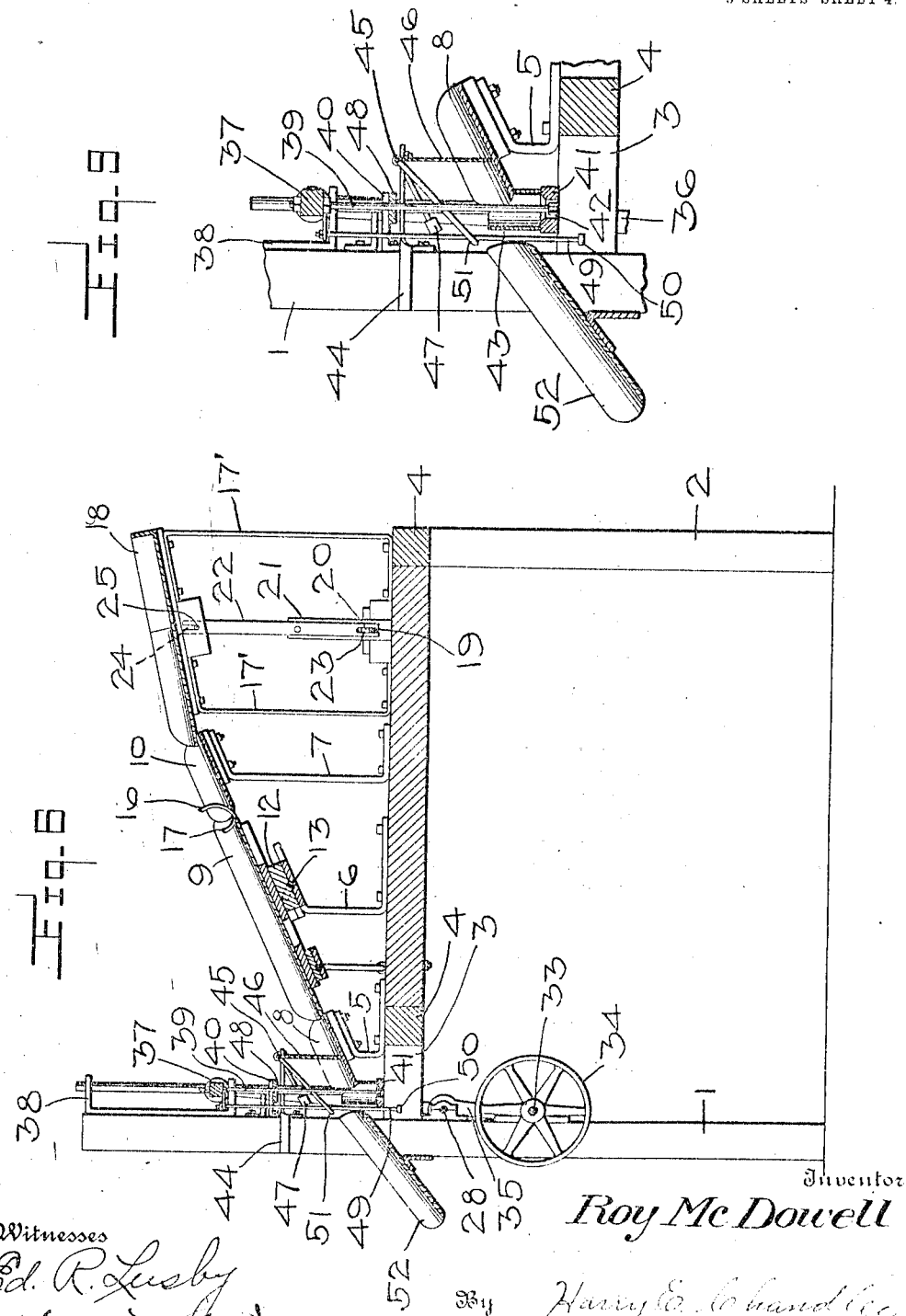

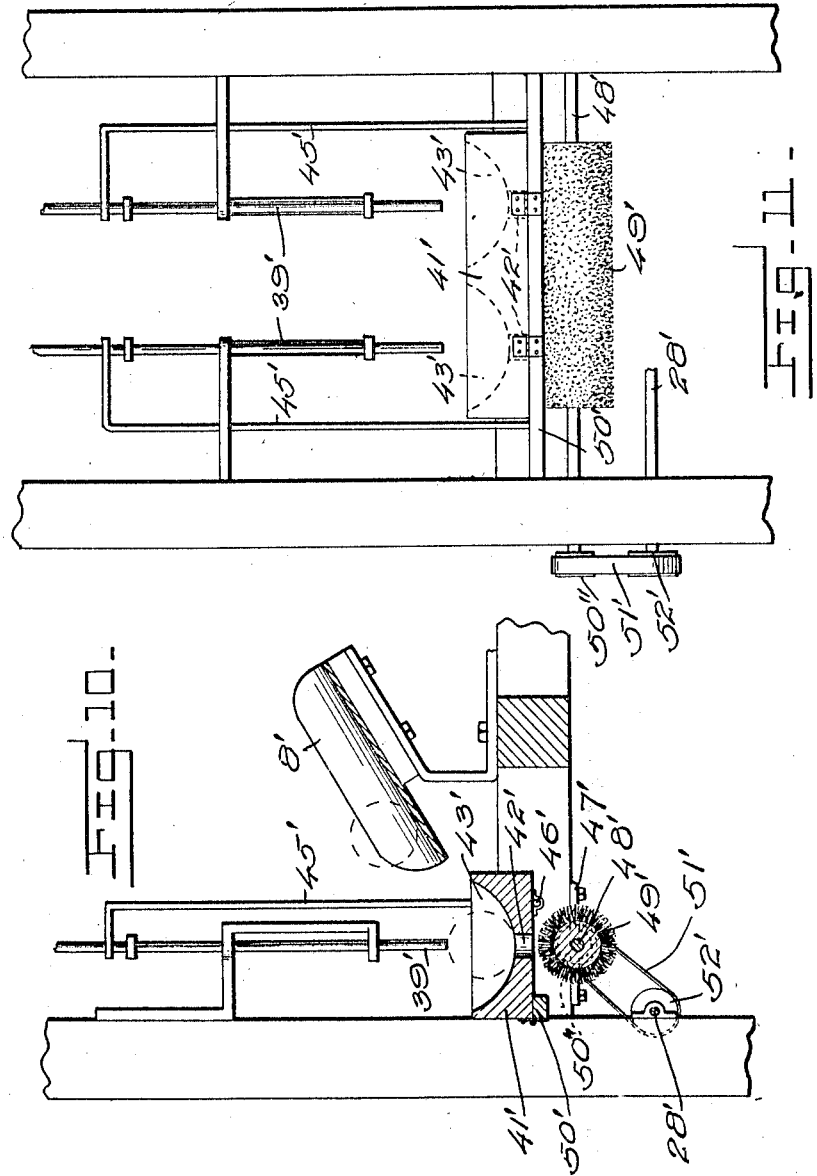

UNITED STATES PATENT OFFICE.

ROY McDOWELL, OF SALEM, OREGON.

CHERRY-SEEDING MACHINE.

1,048,331.  Specification of Letters Patent.  Patented Dec. 24, 1912.

Application filed February 7, 1911. Serial No. 607,047.

*To all whom it may concern:*

Be it known that I, ROY McDOWELL, a citizen of the United States, residing at Salem, in the county of Marion and State of Oregon, have invented certain new and useful Improvements in Cherry-Seeding Machines, of which the following is a specification.

This invention relates to improvements in pitting machines and more particularly to machines for removing the pits from cherries or the like.

One object of the invention is to provide a machine, which will automatically feed the cherries and prevent crowding the same, so that one cherry at a time will be delivered to the pitter proper.

Another object is to provide an efficient means for holding the cherries, while being pitted, means for forcing the stones therefrom, and means for removing the cherries from the pitter-plunger and deflecting them off the machine.

Other objects and advantages will be apparent from the following description, and with reference to the accompanying drawings forming a part of this specification, and in which, Figure 1 is a side elevation of the machine, Fig. 2 is a top plan view, Fig. 3 is an end elevation, Fig. 4 is a vertical section on the line 4—4 of Fig. 3, Fig. 5 is a section on the line 5—5 of Fig. 2 looking in the direction of the arrow, Fig. 6 is a vertical section on the line 6—6 of Fig. 3, Fig. 7 is an enlarged vertical longitudinal section of the shaking feeding troughs, showing in dotted lines the movements of same, Fig. 8 is an enlarged end view of the pitter plunger. Fig. 9 is an enlarged side elevation partly in section, of the pitting device, Fig. 10 is a vertical sectional view of a modification of the pitting device, Fig. 11 is a front elevation of the same.

In the accompanying drawings, 1 represents the forward uprights, 2 the rear uprights, 3 the horizontal longitudinal members, and 4 the horizontal transverse members of the main frame of the machine. On each of the longitudinal members 3, is secured a series of vertical supporting brackets 5, 6 and 7, adapted to support the inclined feeding troughs 8, 9 and 10. The troughs 8 and 10 are secured stationary with respect to the members 3 and at either end of the trough 9, the trough 10 feeding to the trough 9, while the trough 8 receives the cherries therefrom and delivers them to the pitter. The trough 9 has a block 12 on its lower face and transversely through said block is journaled a crank 13, on the outer end of which is a sprocket wheel 14. The lower end of this trough is provided with another block similar to the one just mentioned, through which extends the swinging guide arm 15, the lower end of which is pivotally mounted on the member 3. The upper or rear end of the trough 9 is provided with a series of curved rake fingers 16, which extend rearwardly and upwardly into the lower end of the trough 10, and mesh with a similar set of teeth 17 extending forwardly and upwardly from the lower end of the trough 10. The rotation of the crank 13 through the medium of the sprocket 14 imparts a vertical oscillating movement to the trough 9, the fingers 16 moving upwardly to grasp one of the cherries which is fed into the trough 10, lifting the same upwardly and delivering it into the trough 9, and when said trough moves downwardly, the remaining cherries in the trough 10 will roll against the fingers 17. Thus when the trough 9 moves up and down, it picks a single cherry from the trough 10 and delivers the same to the trough 9, while the rest of the cherries are held in check.

At the rear end of the member 3 of the frame, are the vertical supporting brackets 17', which are composed of thin, flat resilient metal, and on the upper ends of these brackets, is mounted the main feeding container 18, into which are dumped the cherries to be fed to the machine. Suitably journaled between the brackets 17', on the member 3 and running transversely of the frame, is a shaft 19, having formed in its central portion a crank 20 and mounted on one end a pulley 19'. Vertical supports 21, on the members 3 pivotally support a rocker arm 22 having in its lower end an elongated slot 23 in which the crank 20 is adapted to play. At the upper end of the arm 22 is a fork 24, which straddles a pin 25 disposed on the lower face of the container 18. A revolution of the shaft 19 will cause the rocking of the arm 22 and the vibration of the container 18, so that the cherries which are contained therein, will be shaken into the trough 10. A sprocket chain 30 is disposed around the sprocket wheels 14 and 29, the latter of which is on the end of the shaft 28. Mounted below the members 3, on the uprights 1 and in suitable bearings 27, is the transversely arranged shaft 28, having thereon a sprocket wheel 29, which drives the sprocket wheel 14 by means of a sprocket chain 30. This sprocket wheel 29 is disposed outwardly of the uprights, and on the same shaft 28 on the opposite side of the uprights, is a gear wheel 31, which is engaged by a similar wheel 32 on a second shaft 33 journaled on the uprights and below the shaft 28.

The power is applied to the shaft 33 by means of a large belt pulley 34, motion being transmitted by means of the gear wheels 31 and 32 and chain 30 and belt 26, to simultaneously rock the trough 9 and vibrate the container 18. On each end of the shaft 28 and outwardly of the uprights 1, are keyed the cranks 35, which are connected by means of the pitmen 36, to a transverse bar 37 extending across the upper part of the machine, said bar being suitably guided in the brackets 38, on the uprights 1 so that a positive vertical movement is insured. Secured to and depending from the bar 37, between the uprights 1, are the two pitting plungers 39 suitably guided in the brackets 40 on the uprights.

Mounted in the outer end of the brackets 44, secured on the uprights 1 and extending transversely of the machine, is a shaft 45 having secured thereto, the two deflector plates 46, which are adapted to swing across the path of the plungers 39, the said shaft 45 having a weighted arm 47, to hold the plates in their normal lowered positions. A stripper plate 48 is disposed just above the brackets 44 and is provided with suitable openings to allow the plungers to move therethrough. A vertically moving rod 49, is secured to the cross-bar 37 and has on its lower end a head 50 which engages in the forked end of an arm 51, also mounted on the shaft 45, and when the pitters are raised, the rod 49 moves upwardly therewith and causes the head 50 to engage the arm 51, carrying it upwardly and swinging the deflector plates 46 under the plungers. The stripper plate 48 engages the cherry which sticks to the plunger and pushes the same off to drop on to the plate 46 from which it is deflected into an outlet trough 52, and into a suitable receptacle, not shown. When the plunger moves downwardly, the arm 51 is carried downwardly by means of the weighted arm 47 and the plate 46 permitted to assume a vertical position in the trough 8 to prevent the cherries falling into the trough.

In the modification in Figs. 10 and 11 on the front of the members of the frame is a block 41′ formed with the countersunk recesses 43′ and the vertical openings 42′, into which the cherries are delivered one at a time, from the trough 8′. As the plungers 39′ move up and down they will push the pits from the cherries in the recesses 43′ through the openings 42′ of the block 41′. This block is hinged to a cross piece 50′ for a purpose to be referred to later.

A vertically moving rod 45′ is secured at its upper end to the plunger 39′ and has on its lower end an inwardly extending foot 46′ which engages under the bottom of the block 41′, and when the pitters are raised, the foot 46′ moves upwardly swinging the block 41′ on its hinges and discharging the contained cherry. When the plunger moves downwardly, the block 41′ is carried downwardly by means of the foot 46′ and the block 41′ permitted to assume a horizontal position to receive the next cherries falling from the trough. Under the block 41′ and mounted in brackets 47′ is a shaft 48′ which carries revolubly thereon a rotary brush 49′ adapted to brush off the seeds or stones which have been pushed through the block. This shaft carries a pulley 50″, and is driven by means of the belt 51′ from the pulley 52′ on the shaft 28′.

From the foregoing, it will thus be seen that I have provided an efficient device of this character, and one in which the cherries are positively fed one by one to the pitter the pits being quickly removed from the plungers while the cherries are deflected from the machine.

It will be apparent that changes in the form, proportions, and minor details of construction may be resorted to without departing from the spirit or sacrificing any of the advantages of the invention.

What is claimed is:

1. In a cherry pitting machine comprising a frame, the combination with a pitting means, of a vibrating container on said frame, a stationary container adjacent said vibrating trough, a rocking trough adjacent the stationary trough, stop fingers on the stationary trough, feeding fingers on the rocking trough adapted to mesh with the first mentioned fingers, and means for operating the vibrating container and rocking trough.

2. In a seeding mechanism for cherry seeding machines, a supporting frame having a pitting device at one end, a vibrating cherry container located at the opposite end of the frame, a rocking trough in line with the container, an intermediate stationary trough, stop fingers on the stationary trough, cherry engaging fingers on the rocking trough, and means for simultaneously moving the rocking trough and the vibrating container.

3. In a cherry seeding machine, a supporting frame, a pitting device at one end of the frame, flexible supports on the opposite end of the frame, a cherry container mounted on the flexible supports, a rock arm mounted on the frame, one end of the rock arm being engaged with the container, an inclined stationary trough located adjacent the stationary trough section and adapted to receive cherries therefrom, the lower end of the stationary trough having upwardly curved fingers for holding the cherries in check, an inclined rocking trough located in advance of the stationary trough, upwardly curved fingers on the upper end of the rocking trough, the last-mentioned fingers intermeshing with the first-mentioned fingers, the lower end of the rocking trough discharging cherries to the pitting device, and means for simultaneously driving the pitting device, rocking the rocking trough, and vibrating the container.

4. In a cherry seeding machine having a frame, the combination with an intermittent pitting device, including a pitting plunger, a feeding device, a pivotally mounted angular plate, said plate on the frame being disposed adjacent the pitting device and the feeding device, and means carried by the plunger for rocking the angular plate, whereby when the plungers are raised, the angular plate will discharge the pitted cherries, and when lowered retard the flow of cherries to the pitting device.

In testimony whereof I affix my signature, in the presence of two witnesses.

ROY McDOWELL.

Witnesses:
 JOHN H. McNARY;
 ALICE DROSBAUGH.